(12) United States Patent
Harmon et al.

(10) Patent No.: US 7,566,400 B2
(45) Date of Patent: Jul. 28, 2009

(54) WASTEWATER CHEMICAL/BIOLOGICAL TREATMENT METHOD AND APPARATUS

(75) Inventors: John Harmon, Bakersfield, CA (US); Terry Gong, Bakersfield, CA (US); Marcus G. Theodore, Salt Lake City, UT (US); Thomas A. Ruehr, Los Osos, CA (US)

(73) Assignee: Earth Renaissance Technologies, LLC, Salt Lake City, UT (US)

( * ) Notice: Subject to any disclaimer, the term of this patent is extended or adjusted under 35 U.S.C. 154(b) by 0 days.

(21) Appl. No.: 12/286,083

(22) Filed: Sep. 26, 2008

(65) Prior Publication Data
US 2009/0045120 A1    Feb. 19, 2009

Related U.S. Application Data

(63) Continuation-in-part of application No. 11/893,557, filed on Aug. 14, 2007, now Pat. No. 7,455,773.

(51) Int. Cl.
    *C02F 3/00*    (2006.01)
(52) U.S. Cl. .................... 210/631; 210/743; 210/192
(58) Field of Classification Search ................ 210/631, 210/743, 192
See application file for complete search history.

(56) References Cited

U.S. PATENT DOCUMENTS

| | | | |
|---|---|---|---|
| 4,304,673 A | 12/1981 | Reynolds et al. | |
| 4,340,489 A | 7/1982 | Adams et al. | |
| 4,765,911 A | 8/1988 | Rasmussen | |
| 5,906,750 A | 5/1999 | Haase | |
| 6,506,347 B1 * | 1/2003 | Jackson | 422/161 |

OTHER PUBLICATIONS

United Nations Environmental Programme Division of Tech-nology, Industry, and Economics Newsletter and Technical Publications Freshwater Management Series No. 1, "Bio-solids Management: An Environmentally Sound Approach for Managing Sewage Treatment Plant Sludge."

* cited by examiner

*Primary Examiner*—Chester T Barry
(74) *Attorney, Agent, or Firm*—Marcus G. Theodore

(57) ABSTRACT

A chemical/biological wastewater treatment plant apparatus and treatment method employing rapid sludge chemical dewatering technology in conjunction with an environmental biological system for treating the separated treated wastewater by land applying it for the propagation of biosynthetic fuels and other plants; and/or passing it through aqueous plant or microbial reduction of the dissolved solids and ammonia for BOD compliance to produce water of sufficient quality to reduce the overall salt load currently being added by wastewater treatment facilities into natural waterways, and to produce water of sufficient quality to meet open stream and ocean effluent discharge requirements; and disposing of the high BTU low moisture solids.

15 Claims, 3 Drawing Sheets

PACKAGE WASTEWATER TREATMENT SYSTEM

PACKAGE WASTEWATER TREATMENT
SYSTEM

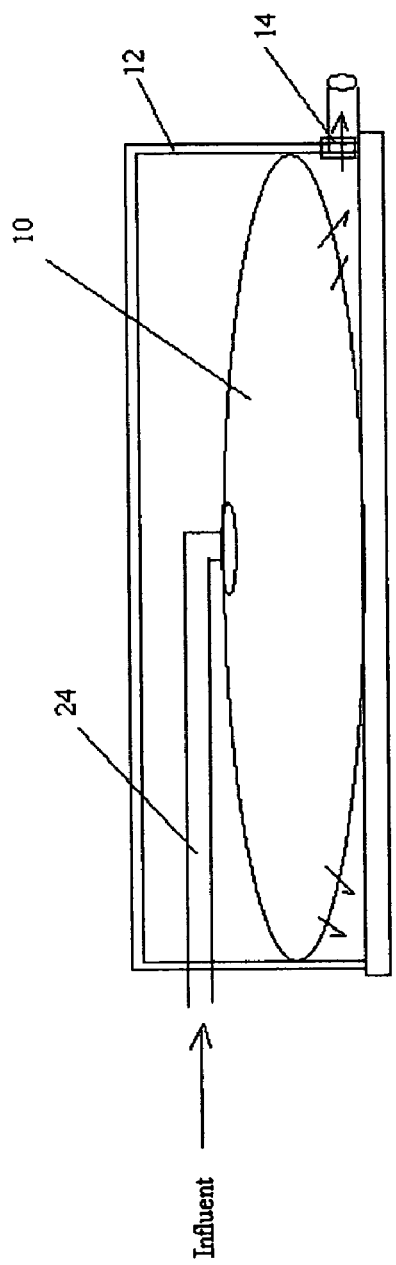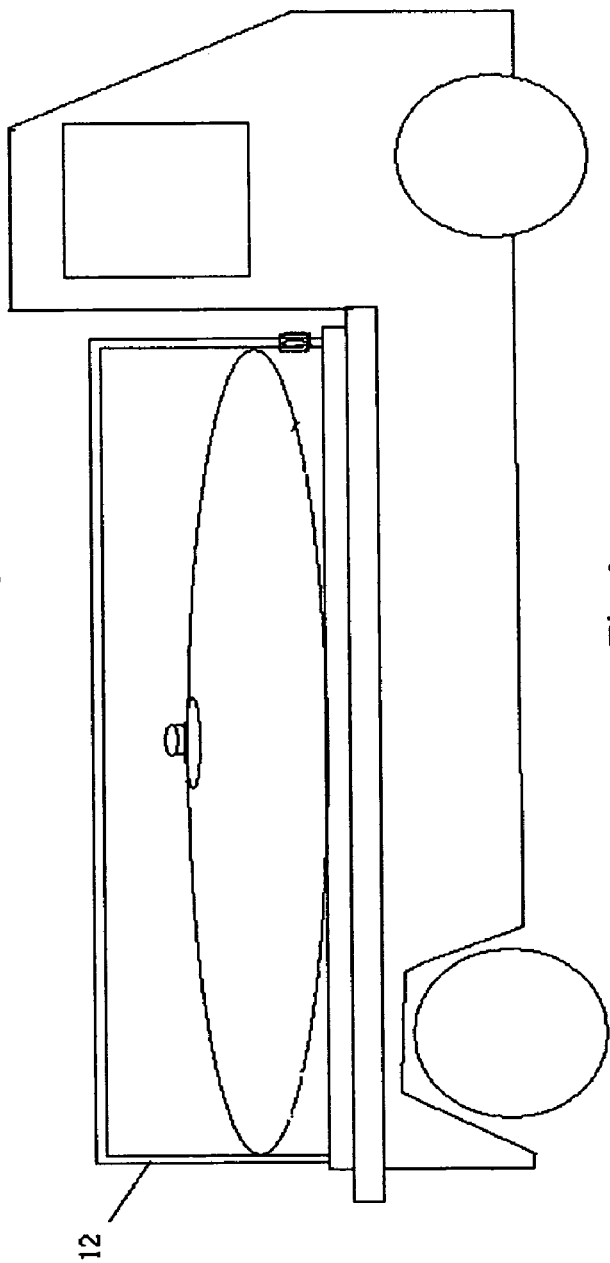

WASTEWATER CHEMICAL/BIOLOGICAL TREATMENT METHOD AND APPARATUS

RELATED APPLICATIONS

This application is a continuation-in-part patent application of the patent application entitled "Package Wastewater Chemical/Biological Treatment Method", Ser. No. 11/893,557 filed Aug. 14, 2007, now U.S. Pat. No. 7,455,773.

BACKGROUND OF THE INVENTION

1. Field

This invention comprises a rapidly installed wastewater treatment plant solids and liquids recovery system apparatus and method employing chemical dewatering and biological treatment technology particularly suited for the treatment of saline wastewaters.

2. State of the Art

Various sewage treatment methods and plants are known. Most large municipal systems employ a series of settling ponds sequentially concentrating the solids contained in wastewater either with or without polymers for separation from liquids via mechanical separation means, such as belt presses. To produce a clean effluent that can be safely discharged to watercourses, wastewater treatment operations use three or four distinct stages of treatment to remove harmful contaminants; according to the United Nations Environmental Programme Division of Technology, Industry, and Economics Newsletter and Technical Publications Freshwater Management Series No. 1, "*Bio-solids Management: An Environmentally Sound Approach for Managing Sewage Treatment Plant Sludge*" stating: "Each of these stages mimics and accelerates processes that occur in nature.

Preliminary wastewater treatment usually involves gravity sedimentation of screened wastewater to remove settled solids. Half of the solids suspended in wastewater are removed through primary treatment. The residual material from this process is a concentrated suspension called primary sludge, subsequently undergoing additional treatment to become bio-solids.

Secondary wastewater treatment is accomplished through a biological process, removing biodegradable material. This treatment process uses microorganisms to consume dissolved and suspended organic matter, producing carbon dioxide and other by-products. The organic matter benefits by providing nutrients needed to sustain the communities of microorganisms. As microorganisms feed, their density increases and they settle to the bottom of processing tanks, separated from the clarified water as a concentrated suspension called secondary sludge, biological sludge, waste activated sludge, or trickling filter humus.

One unfortunate byproduct of conventional preliminary and secondary wastewater treatment is significant evaporation of the liquid phase of the treated effluent resulting in a significant increase in its brine content.

Tertiary or advanced treatment is used when extremely high-quality effluent is required, including direct discharge to a drinking water source. The solid residual collected through tertiary treatment consists mainly of chemicals added to clean the final effluent, which are reclaimed before discharge, and therefore not incorporated into bio-solids. Tertiary or advanced treatment does not reduce the treated wastewater brine content, requiring energy intensive Quaternary brine treatment removal using reverse osmosis and distillation, and other methods.

Combined primary and secondary solids comprise the majority of material used at municipal plants for bio-solids production. Careful management throughout the entire treatment process allows plant operators to control the solids content, nutrient value and other constituents of bio-solids.

The Municipal Sludge-to-Bio-Solids Treatment Process

Three important factors must be addressed through further processing before this material can be utilized: (1) pathogen levels, (2) presence of potentially harmful industrial contaminants, and pharmaceuticals and personal care products, and (3) water content.

The principal process employed to convert municipal sludge into bio-solids is called stabilization. Stabilization accelerates the biodegradation of organic compounds, reduces the microbial population including pathogens, and renders the material microbiologically safe for agricultural use. Biological stabilization uses aerobic or anaerobic treatment to reduce the organic content of solids through controlled biodegradation. Chemical stabilization does not reduce the quantity of biodegradable organic matter in solids, but creates process conditions inhibiting microorganisms, thereby slowing the degradation of organic materials and reducing odors. The most common chemical stabilization procedure is to elevate the pH level of the solids using lime or other alkaline materials. Thermal drying and composting can be used to stabilize bio-solids. Full pasteurization of bio-solids is not needed when the primary use is cropland application. Any potential risk to human health due to exposure to pathogens is eliminated through proper application procedures and in-situ microbial decomposition.

The presence of contaminants in the sludge or bio-solids arising from industrial discharges is a more challenging problem and may be the deciding factor in determining the choice of a utilization disposal option. Put simply, many industries have habitually used the sewer system as a convenient and low-cost way to discharge hazardous wastes. The contaminants accumulate in the biomass and sludge, and can render the material unfit for any beneficial use. The most common options used for disposal of this contaminated material are landfill or incinerations. The cost is usually borne by the municipality rather than the hazardous waste generator. Bio-solids utilization is a good, environmentally sustainable option when the wastewater is from municipal sources only, or when a fully enforced industrial pre-treatment and discharge control system is in place. The decision to select an environmentally sustainable approach to bio-solids management can be used very effectively to review and correct polluting practices up-stream that should not be taking place.

The final concern is the water content of the bio-solids product. Primary and secondary sludge generally contain no more than four percent solids, and the storage and transportation costs of this semi-liquid material limit the application to nearby farmland. Processes to remove water from solids, therefore, are common in bio-solids production. The simplest method for removing water is gravity thickening, involving concentration by simple sedimentation. Allowing sufficient time for solids to settle in tanks can increase suspended solids concentration to five or six percent. Thickening can include flotation processes, gravity drainage belts, perforated rotating drums, and centrifuges. Nothing is added to bio-solids during the gravity thickening processes.

Dewatering is another standard method of water removal in bio-solids production. Simple dewatering involves containment of wastewater solids in drying beds or lagoons, where gravity, drainage, and evaporation remove moisture. More often, dewatering involves mechanical equipment including filter presses, vacuum filters, and centrifuges. Mechanically dewatered solids typically contain between 20% and 45% solids. Finally, drying processes can be used to remove even larger volumes of water from bio-solids. Thermal drying with direct or indirect dryers followed by polarization can remove virtually all water and stabilize bio-solids to the point of full compliance with any regulatory requirement. This method is used where a viable commercial market exists for the pelletized product.

Thus a particular wastewater treatment facility design is highly dependent upon the wastewater inflows and sludge composition and the discharge and treatment permitting restrictions and plant objectives. Oftentimes these plant designs employ thermophilic and other digestion processes to decompose the sludge as part of the separation process. For example, Haase, U.S. Pat. No. 5,906,750 discloses a method for dewatering of sludge previously digested by a thermophilic digestion process employing polymers. The polymers are extremely hydrophilic as they agglomerate fine particles for separation from the wastewater in the belt presses. This gelatinous mechanically separated mass is then usually land filled or admixed with other fuels for burning, and may contain significant pathogens and heavy metals. Once deposited and covered, these landfills do not breakdown rapidly. They comprise large deposits of unstable gelatinous soil, which acts as a breeding ground for pathogens. If these separated solids are treated with chlorine for pathogen kill, chlorinated carcinogens often result, creating a different environmental hazard.

The mechanically separated gray water by-product is usually not treated and is then used for agricultural application, or dumped into a body of water for dilution. If treated with chlorine to kill pathogens before land application or dumping, its usage for agricultural purposes is less than ideal as any residual chlorine acts as an herbicide.

In addition, mechanical sludge separation typically requires a large series of settling ponds with wastewater residence times therein typically from 24 to 48 hours, depending upon the weather and nature of the sludge processed. Typically, landfill and polymer costs represent approximately 30 percent of wastewater treatment costs. This long dwell time results in further concentrations of the brines.

Other mechanical filtration methods provide sludge separation, but require continual unplugging of the filters; generating significant ongoing costs of filter replacement and declining effectiveness as the filter becomes plugged with the separated solids.

As long as a mechanical sewage separation plant does not have to be moved and operates within its environmental discharge and landfill permit constraints, it can be used as a low operating and maintenance cost effective sewage disposal method. However, it is a technique requiring significant upfront capital investment and may result in long term environmental clean-up and remediation costs. As urban populations being served grow and landfill costs increase, these plants seldom meet permitting constraints without significant upgrades in design, particularly with respect to pathogen gray water discharge and the negative impacts caused by mountains of gelatinous solids.

Other chemical wastewater treatment methods employ chemical agglomeration and disposal methods, such as Adams et al., U.S. Pat. No. 4,340,489 wherein wastewater is treated with sufficient sulfurous acid to effectuate disinfection. Polymers and other separation methods are then employed to remove the solids. Reynolds et. al., U.S. Pat. No. 4,304,673 is another wastewater treatment process employing chemicals to disinfect sewage sludge continuously in a similar manner as Adams et al. Rasmussen, U.S. Pat. No. 4,765,911 is another two-stage chemical treatment process for treating aerobic or anaerobic sewage sludge. These chemical wastewater treatment methods are not package systems, not moveable as needed to accommodate the needs of a community, particularly in riparian areas subject to flooding, rely heavily on the use of polymers, and they do not address the issues of BOD's and ammonia in treated wastewater or brine disposal methods.

Thus, there remains a need for a stand alone method and apparatus, able to be rapidly installed either as a mobile or permanent package sewage treatment system, easily retrofitted into existing treatment facilities chemically to treat and recover wastewater solids and liquids for subsequent environmental biological usage and polishing. The method and apparatus described below provides such an invention.

SUMMARY OF THE INVENTION

The present invention comprises of a skid mounted package or fixed installation wastewater treatment plant designed to separate the suspended solids from the liquids for subsequent combination chemical dewatering and biological treatment, and recovering the wastewater for biological treatment.

Method

The method of the chemical/biological wastewater treatment plant is to inject sulfur dioxide into wastewater containing dissolved and un-dissolved solids to condition, disinfect, and deodorize liquids and solids ensuring they can be recovered for beneficial use. Wastewater, as used herein, is principally directed to domestic sewage from dwellings, business buildings, institutions, containing ground water, surface water, and/or storm water, and can include wastewater, having already undergone primary and secondary treatment according to conventional treatment processes. However, if the method is employed primarily as a primary treatment process, it can additionally be used to address other industrial wastes requiring the same conditioning, disinfection, and deodorizing needs. The method comprises passing variable wastewater inflows through filtration to separate suspended solids in the wastewater from the liquids. The liquid filtrate is then treated with sulfurous acid, ($H_2SO_3$), dissociating and thereby producing $H^+$, bi-sulfite ($HSO_3^-$), sulfite ($SO_3^=$), and free $SO_2$ species in solution, all hereinafter all referred to as sulfinurous acid. The treated liquids are then held in a series of dwell tanks, until the desired disinfection and conditioning is attained. Once conditioned, the sulfurous acid treated filtrate is then periodically re-injected into the separated solids as a means to disinfect and dewater them as they undergo filtration. The treated liquids are then held The preferred filtration means consist of woven bags placed within trailer mounted slide containers, designed to separate the solids and to collect the filtered water for subsequent conditioning and to allow the filled bags containing dewatered solids to be conveniently hauled off to a landfill or incinerator without excessive handling.

Although sulfur dioxide from pressurized storage tanks associated with a contact mixer can be used to inject $SO_2$ into the filtered wastewater, a sulfurous acid generator, particularly those produced and distributed by D and J Harmon Company and distributed by Harmon Systems International, LLC of Bakersfield, Calif., is preferred as they produce the chemicals on an as needed basis in an aqueous form preventing harmful operator exposure, visually eliminating the many inherent disadvantages associated when storing and handling tanks of pressurized $SO_2$. Sulfur dioxide produced by the Harmon equipment is injected into the wastewater to achieve a pH range between approximately 1.5 and approximately 3.5, to be held in containment for the required dwell time until sufficient conditioning and disinfection is achieved. At these pH ranges, sufficient $SO_2$/sulfurous acid/bi-sulfite/sulfite are generated to condition solids for separation, and disinfection and deodorizing the wastewater. Thus, by pre-filtering the solids in the wastewater inflows, the filtered wastewater can be fed directly through a sulfurous acid generator without fouling. This equipment has been shown to provide an excellent means to introduce and achieve effective $SO_2$/sulfurous acid/bi-sulfite/sulfite contact with the wastewater solids and liquids without adding additional liquid based materials and unnecessary salts into the wastewater treatment system. Consequently, the treated wastewater volume is not affected and the overall salt load is not significantly changed.

Conditioning of the solids is defined as treating the filtered solids with sufficient $SO_2$ ensuring they will chemically dewater when allowed to drain, forming a fairly dry solid with a BTU content approximating wood chips or shavings. Conditioning generally results in a color change of the solids from a dark brown to a lighter gray brown color. Similarly, the $SO_2$ treated liquids generally change from a greenish color to a lighter gray brown colloidal suspension color. The malodorous smell of the raw wastewater is concomitantly replaced by a slight acidic smell. Consequently, the conditioning point can easily be determined by injecting more and more $SO_2$ into the wastewater until the color and odor changes occur—usually observed at a pH of approximately between 1.5 and 3.5, depending upon dwell time. If the color changes are too faint, the pH can be measured instead. Sulfur dioxide has lone electron pairs, allowing it to act as a Lewis base. Additionally it can act as a Lewis acid. The dissolved $SO_2$ gaseous content varies with temperature. For example, the grams/liter of dissolved sulfur dioxide in water at 20 degrees C. is 106.4 gm/L. It is 55.4 gm/L at 40 degrees. It is 32.5 gm/L at 60 degrees, and 21.3 gm/L at 80 degrees. Consequently, this sulfurous acid treated wastewater system with free $SO_2$/sulfurous acid/bi-sulfite/sulfite present in solution at a low pH forms a complex liquid/gas/solid phase chemistry system where reactions are difficult to describe and quantify exactly, but the above sulfurous acid wastewater conditioning endpoints are distinct. The conditioning of the wastewater and solids via oxidation/reduction reactions thus form self adhering solids, shedding water upon drying, and disinfected wastewater with high plant nutrients at the point where the odor reduction and color changes of the conditioned solids and liquids occur.

The sulfurous acid treated wastewater is then held in a detention vessel, allowing the capture of any excess $SO_2$ emitted by the wastewater for re-injection, until the suspended solids agglomerate, the dissolved solids and ammonia are conditioned, and the required disinfection occurs. Exposure at an elevated acidity (lower pH of approximately 2 with a free $SO_2$ concentration of at least 5 mg./L for approximately 10 minutes results in complete disinfection according to Adams et al., U.S. Pat. No. 4,340,489. Detention at 60 minutes at a pH of 3 results in complete disinfection, although only a slightly significant additional solids separation and agglomeration occurs according to the Montalvo test results discussed below.

The agglomerated solids from the sulfurous acid treated wastewater may then be further screened to remove fine suspended solids in the separated treated wastewater at the level required by the end user effluent handling requirements for disposal. This is not necessary for irrigation canal discharge where the 425 micron particles passing through the GT500 weave of the Geotubes produced by Ten Cate Nicolan of Atlanta, Ga. will not interfere with water handling. However, for irrigation sprinkler usage, suspended particulates in the treated liquids must be reduced to less than 200 microns. To remove these fine colloids, a Geotube® Model GT1000 tighter weave polypropylene woven bag sized to fit within another roll-off container is employed, resulting in fine suspended conditioned solids approximately 150 microns in size. These fines can be totally removed with finer filter bags approximately 100 microns or less in size to produce a clear filtrate solution containing dissolved solids and ammonia as discussed below. According to Ten Cate Nicolan, these drain bags normally act in three stages:

Containment: High strength permeable geotextiles with uniquely designed retention properties are fabricated into Geotube® brand containers able to be filled with fine grain sludge, hazardous contaminated soils, or dredged waste materials.

Dewatering: Excess water drains from the Geotube® brand containers through the small pores in the geotextiles resulting in effective dewatering and efficient volume reduction of the contained material. This volume reduction allows for the repeated filling of the Geotube® brand container. In many cases the decanted water is of a quality allowing it to be returned to native waterways or for reuse.

Consolidation: After the final cycle of filling and dewatering, the retained fine grain materials can continue to consolidate by desiccation because the residual water vapor escapes through the geotextile.

The screened sulfurous acid wastewater filtrate is then pH adjusted to reduce the biocidal properties of the free $SO_2$ and bi-sulfites/sulfites in the wastewater by raising the pH with dry or hydrated lime to provide the pH required for subsequent environmental biological treatment. The calcium added lowers the Sodium Adsorption Ratio (SAR) and off-sets any sodium accumulation allowing the $SO_2$/sulfurous acid/bi-sulfite/sulfite treated wastewater to be safely applied to a wider range of soils including alkaline and high pH soils and to maintain and/or improve their existing soil fertility.

The screened pH adjusted $SO_2$/Sulfurous acid/bi-sulfite/sulfite filtrate of the wastewater inflows can be high in dissolved solids and nutrients including ammonia, a solution promoting rapid bacterial and plant growth, and can be measured by its high BOD value. Thus, by utilizing it for its high calcium content, ammonia and plant nutrients, ability to lower the pH of alkaline soil by delivering additional acidity into the soil, and for its properties to reduce and suppress soil pathogens, etc., allows this type of water to be utilized for its ability to act as a soil amendment and to be a source of valuable plants nutrients, making this method and the conditioned wastewater it produces ideally suited for the propagation of suitable crops (where and whenever its use is allowed), or the use of artificial wetlands, as the primary biological means to utilize and remove these constituents. By passing and allowing plants or bacterial and fungal microbes to utilize and biologically reduce the dissolved solids and ammonia (for BOD compliance) from the conditioned wastewater, sufficient improvement in water quality can be attained to meet open stream and ocean effluent discharge requirements with minimal capital costs expenditure. For example, an existing wastewater treatment plant's aerobic digesters may be used for this purpose. Or preferably, the conditioned wastewaters are passed through wetlands for reduction and removal of these dissolved solids and ammonia to produce high quality water meeting open stream BOD discharge requirements. Alternatively, duckweed aquaculture ponds may be employed for this purpose where land costs are not prohibitive and sufficient lands for ponding is available.

In one embodiment, saline wastewater is conditioned and pH adjusted after sulfurous acid treatment to a brine level suitable for plant production of biosynthetic fuels. This produces a method of disposal and reuse of saline wastewater for the production of biosynthetic fuels via SAR soil adjustment, as discussed below. The advantage of growing biosynthetic fuels is they sequester carbon dioxide and avoid potential microbial transfer to edible crops.

In another embodiment, the saline wastewater is conditioned and pH adjusted after sulfurous acid treatment to a higher brine level suitable for the raising of halophytes.

In still another embodiment, the conditioned and pH adjusted sulfurous acid treated wastewater is used to raise hallophile organisms, which can be land applied for fertilizer.

If heavy metals are present in sufficient amounts in the filtered $SO_2$ treated liquid fraction, the treated wastewater pH can be raised to precipitate and separate out the heavy metals contained in the wastewater resulting in metal free filtrate. Ideally, this process is conducted prior to subsequent biosolids consolidation. A pH of up to 11 will precipitate all of the heavy metals as metal hydroxides. If there are heavy metal hydroxides, which become more soluble at higher pH levels, they are sequentially removed with filtration. For example, at higher pH levels, chromium and possibly iron and aluminum become more soluble as $Fe(OH)_4^-$ or $Al(OH)_4^-$ or $Cr(OH)_4^-$ ions. They therefore are removed at the pH at which they precipitate before the pH is then raised higher to remove other heavy metal hydroxides.

The final high pH is then acid reduced for environmental biological treatment — usually to a pH range of approximately 6 to approximately 8. Other factors in the selection of this pH are the soil alkainity in a region, and whether the treated wastewater will be land applied or discharged to an aqueous environment.

The high pH around 11 causes ammonia to separate into a gas for possible removal through scrubbing where the ammonia level in the acid treated wastewater is too high for secondary recovery water re-usage. However, for most $SO_2$ treated wastewaters, the biological removal of ammonia via plant consumption is sufficient.

The chemically dried solids are low in water content and have the consistency of fibrous cardboard, becoming a powder when ground. Tests at the Montalvo Wastewater Treatment Plant of solids separated with a GT1000 Geotube indicated a treated solids BTU content of 6090 BTU's/lb, and a moisture content of 7.3% of its oven dry weigh[1], being acceptable for municipal burners.

[1] moisture content for wood ranges from 0% oven dried wood to greater that 200% for a living tree, using this lab formula MC%=(weight of moist wood–weight of oven dried wood)/(weight oven dried wood)×100%

The dwell tank holding time will vary based upon the wastewater content and the pH utilized. It is selected sufficiently to agglomerate the suspended solids for capture within the porous bag. The longer the holding time, the more agglomeration will result. However, within thirty minutes, separation of the majority of the solids has occurred. Further elimination of the remaining small colloidal fines can be removed, if desired, by the use of tighter mesh bags or filters or filtration media for separation. The separated suspended solids are then allowed chemically to dewater in the porous bag to provide the high BTU content solid with low water content for burning or gasification.

In extreme climates subject to freezing, other filtering means, including belt presses and screening means, housed in a heated enclosure may be employed, including the Fine-screen Monster™ produced by JWC Environmental of Santa Ana, Calif.

The following is a preferred universal chemical/biological wastewater treatment plant method for wastewater inflow streams with dissolved and un-dissolved solids able to be chemically dewatered by the injection of $SO_2$ to condition and deodorize both the liquids and solids for recovery. The method comprises:

a. screening the variable wastewater flows through filtration means, allowing separation and capture of the coarse solids from the filtered liquids, b. deodorizing and conditioning the filtered liquids by passing it through a sulfurous acid generator for admixing with sulfur dioxide at a pH generating sufficient free $SO_2$, bi-sulfite, and sulfite to form a sulfurous acid treated separated wastewater stream and acidifying and conditioning solids for disinfection, separation, and to deodorize the wastewater based on dwell time, the screening porosity selected enabling the inflow stream not to plug up the sulfurous acid generator, c. passing a portion of the sulfurous acid treated separated wastewater stream through the filtration means to condition and chemically dewater the separated course solids, d. holding the filtered and conditioned liquids within the same vessel where the sulfur dioxide was injected, or a separate detention vessel, any excess $SO_2$ emitted by the acidified wastewater can be captured and reintroduced again into the system, and holding the same for a period of time until the wastewater odor is suppressed and the suspended solids are conditioned to agglomerate and separate from the liquid fraction of the wastewater for solids separation by filtration; and the dissolved solids and ammonia are conditioned and the required effluent disinfection occurs, e. pH adjusting the screened treated wastewater by raising its pH to reduce the biocidal properties of the free $SO_2$, sulfite, and bisulfite in the wastewater and provide the required pH for subsequent environmental biological treatment for reduction of the dissolved and suspended solids and ammonia to meet applicable land and open water discharge limits, and f. environmentally biologically treating the separated treated wastewater by land applying it for plant consumption, and/or passing it through aqueous vegetation or microbial reduction of the dissolved solids and ammonia for BOD compliance to produce water of sufficient quality to meet applicable open water discharge requirements.

Where soil salinity is an issue, the pH of the applied screened wastewater is lowered to a pH of 5 to 7 to prevent bicarbonate plugging of the soil pores, allowing soil waters to flow and carry away salts before they accumulate. The buffering action of the bicarbonate ion disassociation of the sulfurous acid continues to release acid into the soil after soil application (by the action of sulfur oxidizing microorganisms) to maintain the soil porosity after application.

Additionally, the sodium/calcium ratio is adjusted, along with the chloride/sulfate ratio to prevent adverse effects on the plants. "Soil particles of clay and humus (organic matter) have the property of Cation Exchange Capacity (CEC) whereby cations (+ charged electrical ions) are held against leaching downward with rain or irrigation water. Typically, the major cations on the soil Cation Exchange Capacity are Calcium ($Ca^{2+}$), Magnesium ($Mg^{2+}$), Sodium ($Na^+$) and Potassium ($K^+$), with small amounts of Strontium ($Sr^{2+}$) and Barium ($Ba^{2+}$). Dehydration of sea water or other salty water preferentially causes the calcium, strontium and barium to become relatively less soluble as carbonates and sulfates. This allows more magnesium and especially sodium and potassium to accumulate as has occurred in the Tulare Lake basin and in the Buena Vista Lake basins of California. Sodium ($Na^+$) cations cause the soil to disperse (moving the clay and humus particles away from one another). This is detrimental to soils because these particles move downward and seal over the smallest existing soil pore; thereby preventing further downward water movement and preventing effective salt leaching. Ideally, the cations are leached downward with applied irrigation water through open soil pores as either the Anions (negatively charged ions) of Sulfate ($SO_4^{2-}$) or Chloride ($Cl^-$). Although other salt anions could be used, they have undesirable consequences. For example, Nitrate ($NO_3^-$) is a fertilizer, but if it is leached into ground water it can cause environmental contamination as would the use of Perchlorate ($ClO_4^-$). Application of sulfuric acid ($H_2SO_4$) to soil high in limestone causes the limestone [Calcium Carbonate ($CaCO_3$)] to dissolve and form Gypsum ($CaSO_4.2H_2O$) in the soil. This insures effective soluble Calcium ($Ca^{+2}$) ions to exchange on the CEC sites pushing the Sodium ($Na^+$) ions off and allowing them to be leached downward. Normally, in a high limestone soil the calcium is essentially insoluble and not effective in exchanging with the sodium and thereby prevents effective sodium leaching. Plants can tolerate a modest level of sulfate, but they do not grow as well with high chloride. The problem for growers is sulfates have lower solubility and lower salt leaching ability than do chlorides."[2]

[2] see "Salt Leaching, Nutrient Movement and Crop Absorption" by Professor Thomas A. Ruehr, Cal Poly Service Learning Project Match; http://www.honorsporjects.com/view.php?id=63; Also see "Rootstock Selections for Improved Salinity Tolerance of Avocado" by David Crowley, Woody Smith, and Mary Lu Arpaia; Depts of Environmental Sciences and Botany and Plant Sciences, University of California, Riverside; CAC Growers Research, http://www.avocado.org/growers/pages/proceedings/p4_crowley.php, discussing how high sodium is thought to displace calcium from the root cell walls causing leakage of potassium and other plant metabolites from the root.

Preferably, the chemical/biological wastewater treatment method is operated allowing the calcium content of the waste water to be increased to affect a decrease of the Sodium Adsorption Ratio (SAR) of the waste water to enhance the agronomic condition of the soil where it is applied. Plants are detrimentally affected, both physically and chemically, by excess salts in some soils and by high levels of exchangeable sodium in others. Soils with an accumulation of exchangeable sodium are often characterized by poor tilth and low water permeability making them unfavorable for plant growth. Plant growth is important for several reasons: (i) it provides an erosion control measure for hill slope erosion and stream bank erosion, (ii) it allows for re-vegetation of reclaimed areas, and (iii) it can possibly aid in metals absorption by phyto-remediation with specific types of plants. The Sodium Adsorption Ratio (SAR), along with pH, characterizes salt-affected soils. It is an easily measured property providing information on the comparative concentrations of $Na^+$, $Ca^{2+}$, and $Mg^{2+}$ in soil solutions. The equation used to calculate SAR is given as follows:

$$SAR = \frac{[Na^+]}{\sqrt{\frac{1}{2}([Ca^{2+}] + [Mg^{2+}])}}$$

where $[Na^+]$, $[Ca^{+2}]$, and $[Mg^{+2}]$ are the concentrations in mmol of monovalent ion equivalents/L of sodium, calcium, and magnesium ions in the soil solution. Concentrations of sodium, calcium, and magnesium are determined by first extracting the ions from the water saturated soil into solution. The solution is then analyzed to determine the concentrations of the selected ions. $Na^+$, $Ca^{2+}$, and $Mg^{2+}$ concentrations commonly determined using atomic absorption (AA) spectrometry. The SAR of a soil extract takes into consideration for the adverse effect of sodium being moderated by the presence of calcium and magnesium ions. When the SAR rises above 12 to 15, serious physical soil problems arise and plants have difficulty absorbing water according to some studies. The ideal SAR is below 9.

By utilizing this type of conditioned wastewater to propagate bio-synthetic fuel crops, native vegetation, landscape plants, crops for animal and/or human consumption (when allowed), this method of treatment can also be utilized as part of a comprehensive plan to reduce the overall concentration and salt load currently being added by conventional wastewater treatment facilities into our nation's rivers and natural waterways. The recovered treated water serves as a substitute alternative water supply reducing the need to take water from a river or deep well aquifers. By leaving more water in natural waterways, water quality is improved as salts remain more diluted downstream. Further, any salts within the recovered treated wastewater are spread and leached deeper and more evenly over a wider area of land and/or watershed. This slows down and lessens the concentration of salts reentering a river system and can improve water quality during times of drought. Although heavy rain events may cause some of these land applied salts to be eventually washed back into the river, it occurs at a time when they are significantly diluted. As a viable irrigation alternative to pumping water from deep wells, it can also help to prevent subsurface salts from being brought back to the surface where they can re-enter and co-mingle with the existing surface flow of a river.

This saline water treatment technology was tested at the Saticoy-Jose Florez Treatment Facility owned and operated by the Saticoy Sanitary Improvement District (SSD) to dispose of its high saline wastewater discharge via propagation of salt sensitive avocado plants without the need for additional dilution. Results from the Saticoy tests confirmed this hybrid chemical/biological wastewater dewatering technology provides recovered treated effluent suitable for growing crops. Additionally, it provides rapid solids separation with little or no polymer usage, disinfection (<2 coliforms Most Probably Number (MPN) per 100 milliliters), inactivation of many pharmaceuticals, and perchlorates, and heavy metals removal from the treated wastewater. The technology thus provides a treated recovered wastewater suitable for land application, by conditioning the water to off-set its high saline content. The acidified treated effluent in addition prevents the plugging of soil pores to provide an inexpensive irrigation disposal option for moderately saline wastewater, avoiding the need to separate and dispose of brines by more costly reverse osmosis membrane separation methods.

Unless the heavy metals are high and excessive, pH adjusting of the separated treated wastewater to precipitate heavy metals contained in the wastewater for filtration removal is not required. The pH adjustment is raised to meet the required pH for subsequent environmental biological treatment for polishing the separated water to meet the end user requirements. The chemically dewatered separated solids are then preferably disposed of in a municipal burner or gasifier. Alternatively, they may be land applied as they have been disinfected and the heavy metals have been removed during the conditioning process. They can be composted prior to land application for crop production, especially by biosynthetic fuel producing crops.

Apparatus

An example of a preferred skid mounted chemical/biological wastewater treatment plant apparatus for wastewater comprises screening means for receiving variable wastewater influent flows from a municipal wastewater gathering system. The screening means separate large suspended solids to a level suitable for an end user's needs. The entrapped screened suspended solids are periodically treated with sulfurous acid chemically to dewater and disinfect the solids before disposal.

The screened wastewater inflows are then passed through a series of mesh bags mounted on roll-off trailers with a weave preferably selected to contain odors of entrapped suspended solids. The separated wastewater liquids are then passed through a sulfurous acid generator for injecting $SO_2$ into the screened wastewater. The sulfurous acid treated wastewater is repeatedly passed through the sulfurous acid generator, if required, until a pH is generated with sufficient sulfurous acid, bi-sulfite, and free $SO_2$ for odor suppression and conditioning the suspended solids. At a pH of approximately 1.5 to 3.5, any remaining suspended solids agglomerate and separate from the liquid fraction of the wastewater for solids separation by filtration. The sulfurous acid treated wastewater filtrate is then pumped into detention vessels.

If the wastewater treatment plant does not have an auger or grinder to reduce the size of the screened suspended solids in the wastewater inflows, similar comminuting means are included before passing the solids through the woven mesh bags. The detention vessel holding time is selected to deodorize and condition the $SO_2$ treated wastewater influent, until the suspended solids agglomerate, dissolved solids and ammonia are conditioned, and the required effluent disinfection occurs. The detention vessels are enclosed to capture any excess $SO_2$ released from the $SO_2$ treated wastewater influent for re-injection into the entering wastewater inflows.

Secondary screening means, using filtration bags, belt presses, and other mechanical separators may be employed to separate the suspended solids from the sulfurous acid treated wastewater from the drained detention vessels more effectively, if required. The type of filtration employed is selected to remove suspended solids at a level required by the specific end use effluent requirements for disposal. Again, the preferred secondary screening means comprises acid resistant porous bags placed on a roll-off container structured to receive the sulfur dioxide treated wastewater. The drain bag is selected with a mesh sized to collect and separate particles of suspended solids of a desired size leaving a solution of a desired colloid content. For most filtration applications, passage through a single drain bag will provide sufficient filtration. Alternatively, these bags may be employed in series to promote faster draining by first removing the larger particles, before passing the suspended colloid particles through a bag with finer mesh. For example, the Ten Cate Geotube Model GT500 drain bag has a US Sieve # 40 with an apparent opening size of 425 microns more particularly described in the table below is used to first remove larger particles from the entering wastewater.

| Mechanical Properties | Test Method | Unit | Minimum Average Roll Value | |
|---|---|---|---|---|
| | | | Machine Direction | Cross Direction |
| Wide Width Tensile Strength (at ultimate) | ASTM D 4595 | kN/m (lbs/in) | 70 (400) | 96.3 (550) |
| Wide Width Tensile Elongation | ASTM D 4595 | % | 20 (max.) | 20 (max.) |
| Factory Seam Strength | ASTM D 4884 | kN/m (lbs/in) | 70.1 (400) | |
| Apparent Opening Size (AOS) | ASTM D 4751 | mm (U.S. Sieve #) | 0.425 (40) | |
| Water Flow Rate | ASTM D 4491 | l/m/m$^2$ (gpm/ft$^2$) | 813 (20) | |
| Mass/Unit Area | ASTM D 5261 | g/m$^2$ (oz/yd$^2$) | 585 (17.3) (Typical Value) | |
| UV Resistance (% strength retained after 500 hrs) | ASTM D 4355 | % | 80 | |

The filtered treated wastewater may then be run through a Ten Cate Geolon® GT1000 drain bag composed of high-tenacity polyester multifilament yarns, woven into a stable network allowing the yarns to retain their relative position. The Geolon GT1000 has a US Sieve #100 with an apparent opening size of 150 microns more particularly described in the table below.

| Mechanical Properties | Test Method | Unit | Minimum Average Roll Value | |
|---|---|---|---|---|
| | | | MD | CD |
| Wide Width Tensile Strength (at ultimate) | ASTM D 4595 | kN/m (lbs/in) | 175 (1000) | 175 (1000) |
| Wide Width Tensile Elongation (at ultimate) | ASTM D 4595 | % | 15 (max.) | 15 (max) |
| Trapezoidal Tear | ASTM D 4533 | kN (lbs) | 3.6 (800) | 3.6 (800) |

-continued

| Mechanical Properties | Test Method | Unit | Minimum Average Roll Value | |
|---|---|---|---|---|
| | | | MD | CD |
| Factory Seam Strength | ASTM D 4884 | kN/m (lbs/in) | | 87.5 (500) |
| Puncture Strength | ASTM D 4833 | kN (lbs) | | 1.8 (400) |
| Apparent Opening Size (AOS) | ASTM D 4751 | mm (U.S. Sieve #) | | 0.150 (100) |
| Water Flow Rate | ASTM D 4491 | l/m/m$^2$ (gpm/ft$^2$) | | 240 (6) |
| UV Resistance (% strength retained after 150 hrs) | ASTM D 4355 | % | | 65 |

If these drain bags are interconnected and placed in series, they are sized ensuring the flow rates through the bags allow continuous flow—i.e. the GT 5000 bags with a flow rate of 813 L/minute/m$^2$ in communication with the GT 1000 bags with a flow rate of 240 L/minute/m$^2$ requires them to be three and a third times larger, or their number of the same size bags increased providing the flow rates through both bags provide continuous flow. Where the plant drainage footprint is of sufficient size, the matching of the drain bag sizes is not critical, and standby extra capacity drain bags are generally employed to accommodate storm wastewater surges or uneven flows.

These combination containerized bags, when placed in series, thus produce a filtrate substantially less than 200 microns required for land application through existing sprinkler and irrigation equipment.

The filtered and SO$_2$ conditioned wastewater is then collected and pH adjusted employing pH adjustment means, allowing one to use the skid mounted lime injection equipment produced by Metalfab, Inc. of Vernon, N.J. This particular equipment is a continuous lime feeding apparatus employed for adjusting the separated treated wastewater to reduce the biocidal properties of the SO$_2$, bi-sulfite, and sulfite in the wastewater and to provide the pH required for subsequent environmental biological treatment.

Other pH reduction means to control pH may be employed, including injecting a stream of hydrated lime or ammonia from a vat into the sulfurous acid treated wastewater to increase its pH before entering a collection basin or reservoir. Although other basic chemicals may be employed, lime is well suited as it provides calcium ions to aid in soil conditioning and to off-set the high levels of sodium and to prevent its buildup in the soil as it will retard plant growth and degrade agronomic conditions.

In cold weather conditions where long freezes are encountered, a mechanical separator is employed instead of the drain bags to remove the suspended solids. Continuous bag screening systems including the Finescreen Monster™ and Bandscreen Monster™ produced by JWC Environmental of Costa Mesa, Calif. have small footprints and produce a fairly dry filtrate solid. These units can be housed indoors, along with the dwell tanks, and liming equipment in a small enclosed building to provide an all weather chemical biological wastewater treatment system. The screens are generally selected to remove only the larger particle unwanted conditioned suspended solids to provide treated wastewater with sufficient plant nutrients for field application. However, if desired, finer and finer screens could be employed to provide more polished filtered water. A second pass of sulfurous acid can then be reintroduced to disinfect and dewater the collected solids.

The pH adjusted screened and treated wastewater is then passed through an environmental biological system for further reduction of the dissolved and un-dissolved solids and ammonia, or by land applying it for plant consumption. The manner of land application is dependent upon the type of crop and whether it is consumed raw. When the pH adjusted separated and treated wastewater is pathogen free, the manner of land application is generally not restricted. However, use on non-consumable crops only requires partial disinfection and is the preferred method of disposal. Alternatively, the pH adjusted separated and treated wastewater may be passed through a wetlands transition zone where aqueous plant or microbial reduction of the dissolved and un-dissolved solids and ammonia occurs to reduce BOD's to produce water of sufficient quality to meet open stream and ocean effluent discharge requirements.

Wastewater treatment inflows entering a wastewater treatment plant generally have relatively low heavy metals content. However, in those regions near mining tailings or industrial sites, heavy metal contamination of the liquids entering the treatment plant can be significant. In addition, where the heavy metals in the solids are excessively high limiting their use for land application, these solids heavy metals are removed in the process either by precipitation at high pH with lime and separation or by acid leaching them into the liquid fraction by the sulfurous acid wastewater treatment. To remove these heavy metals from the liquid fraction, the pH of the separated treated wastewater is raised sufficiently to precipitate those heavy metals contained in the wastewater as metal hydroxides for filtration removal via belt presses or tighter weave polyethylene woven bags or other filtration means.

The actual design of the package wastewater treatment apparatus employing the method depends on the polishing requirements of the separated water for end use. The small footprint and rapid chemical treatment of the wastewater inflows provides opportunities to install the system and re-inject the treated wastewaters at various points in an existing wastewater treatment plant. Thus, portions of an existing wastewater treatment plant's processing equipment are often incorporated in treating the solids and separated liquids by combining treatment streams and solids. For example, where an existing plant has sequential batch reactors or primary clarifiers to remove the variable inflow solids, the woven containerized pre-treatment filter bags are not required. The wastewater treatment plant's separated filtrate is directly conditioned with the sulfurous acid generators and passed through the dwell tanks for subsequent pH adjustment and land application. Furthermore, if the existing wastewater treatment plant produces a lower BOD dissolved solid/liquid stream, the wastewater treatment plant streams may be combined with the higher acid treated BOD liquid stream to produce an overall lower dissolved solid liquid fraction requiring less biological treatment.

SUMMARY

The chemical/biological package wastewater treatment plant method and apparatus optimizes sewage treatment by adjusting the effluent to meet the needs of an end user. It employs rapid sludge chemical dewatering and disinfection technology in conjunction with an environmental biological system for treating the separated treated wastewater by land applying it for plant consumption, and/or passing it through aqueous plant or microbial reduction of the dissolved solids and ammonia for BOD compliance to produce water of sufficient quality to meet open stream and ocean effluent discharge requirements. It has a small footprint and can be integrated to supplement and/or replace the existing equipment and processes of an existing wastewater treatment plant to optimize solids separation and treated water recovery. Consequently, streams of sulfurous acid treated influent may be combined with effluent from the existing plant to provide a blended effluent meeting an end user's requirements.

DESCRIPTION OF THE DRAWINGS

FIG. 2 illustrates a drain bag in a roll-off container.
FIG. 3 illustrates a filled drain bag and roll-off container being hauled off for bag disposal

DESCRIPTION OF THE ILLUSTRATED EMBODIMENTS

Figure 1:
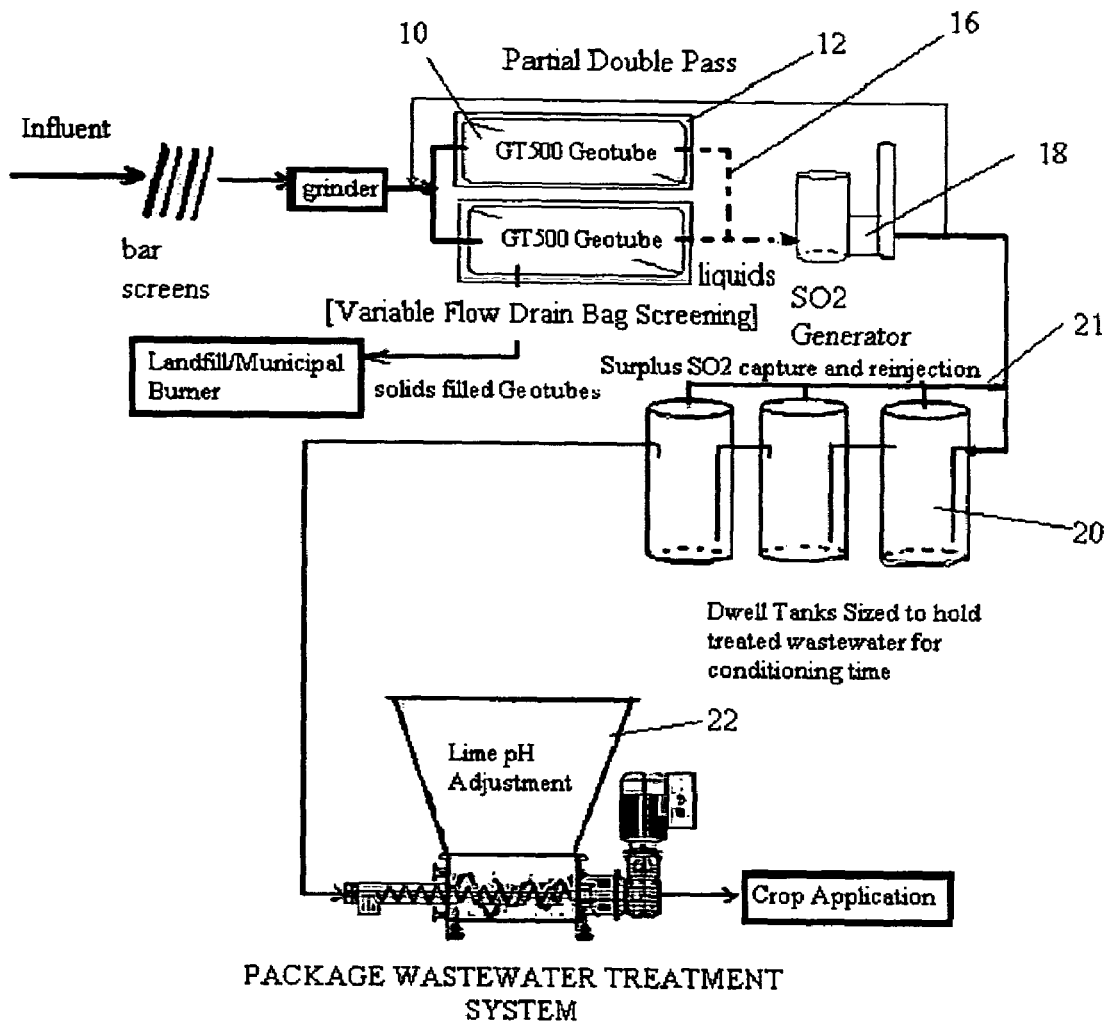
FIG. 1 illustrates a preferred embodiment of the invention.

An embodiment of the method and apparatus of the present invention is shown in FIG. 1. It comprises taking the screened and ground wastewater influent and passing it through a series of GT 500 Geotubes 10 for further screening and collection of the solids. The Geotubes 10 are placed in roll-off containers 12, possessing drain ports 14 shown in FIG. 2. The GT 500 Geotube 10 has odor containment properties, and allows variable wastewater flows to pass through for collection in the containers 12, while retaining the courser solids. Piping 16 associated with the drain ports 14 collects the filtered wastewater and passes it through a sulfurous acid generator 18 to create the sulfurous acid solution. Because the coarser solids are removed, the sulfurous acid generator 18 will not plug. The sulfurous acid generator 18 includes variable controls to add more or less sulfur dioxide to the filtered wastewaters as the flows increase or decrease ensuring a fairly constant acidic composition is maintained. To insure disinfection, promote chemical dewatering, and odor control of the captured solids, periodically acidified wastewater is passed through the GT500 Geotubes.

The screened and acidified wastewater is then passed through a series of interconnected dwell tanks 20 sized to insure the flows through these locations have the required dwell time for conditioning and disinfection. The filtered conditioned and disinfected wastewater is then passed through liming equipment 22 before land application.

As shown in FIG. 2, the drain bags 10 may be placed in an enclosed container if odors are not contained in the bags 10. When filled, the fill hoses 24 are removed from the filled bag 10 and another roll-off container 12 with fill bag 20 is connected to the fill hose 24 to continue to receive and filter the wastewater influent. The filled bag 20 in the roll-off container 12 is then loaded on trucks for hauling to a landfill or municipal burner or gasifier. The roll-off containers 12 are preferably of standard size for highway hauling, and the drain bags 10 are sewn to fit therein.

The package chemical/biological wastewater treatment plant 25 can be rapidly deployed and constructed in flood planes and small footprints of existing plants. Consequently split streams may be combined with the filtered, conditioned, disinfected, pH adjusted wastewater, if desired.

Figure 4:
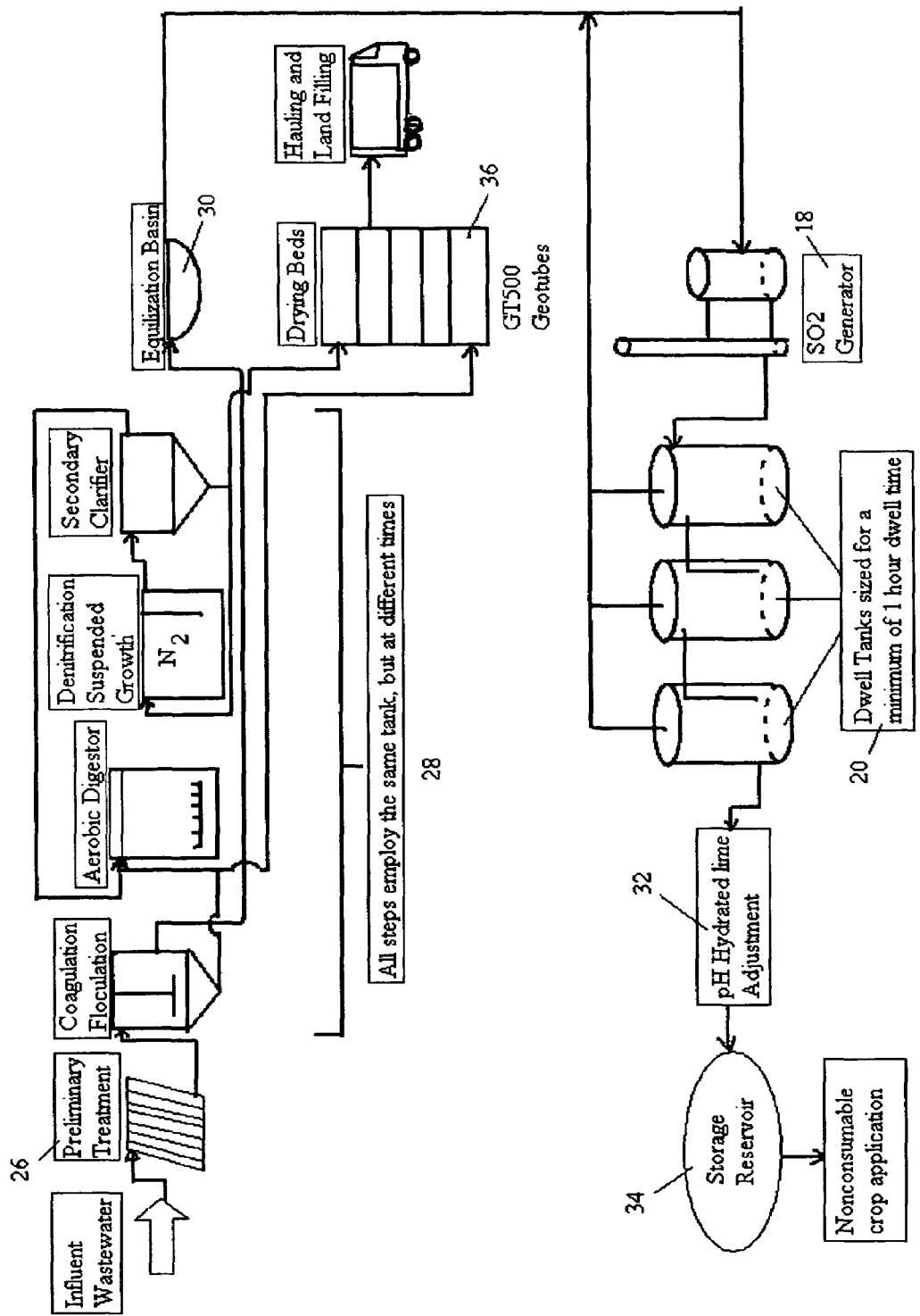
FIG. 4 illustrates the Montalvo Wastewater Treatment Plant adapted with process of the invention of FIG. 1.

FIG. 4 illustrates how the package chemical/biological wastewater treatment plant 25 may be installed at an existing facility using a majority of its components. The illustration shows the Montalvo Municipal Improvement District Water Pollution Control Plant in Ventura, Calif. adapted with the package chemical/biological wastewater treatment plant 25 for recovery of wastewater for land application. Instead of using drain bags 10 in roll-off containers 12 for variable flow screening, the present bar screens and grinders 26 and the sequencing aerobic and de-nitrification batch reactors 28 are used to filter the suspended solids for discharge into an equalization basin 30. The clear decant from the equalization basin 30 is then passed through a sulfurous acid generator 18 for acidification and passage into the dwell tanks 20. Acidified conditioned wastewater is then pH adjusted with a drip hydrated lime system 32 employing carboys (not shown) delivered to the site as needed. The pH adjusted conditioned wastewater is then collected in a storage reservoir 34 for final pH testing before land application.

The solids in the present Montalvo drying beds 36 may be periodically treated with a solution containing sulfurous acid from the dwell tanks 20 to aid in chemical dewatering.

This package chemical/biological wastewater treatment plant 24 provides acid treated disinfected and conditioned wastewater, suitable to be land applied where small amounts of ammonia and dissolved solids provide soil amendment. Furthermore, the resulting volume of separated solids is considerably less than what is encountered in the present operations, while making available annually approximately 365 acre feet of secondary recovery water for agricultural and landscaping use. The resultant treated filtered wastewater is thus disinfected without need for further chlorine treatment. As the land surrounding the plant contains alkaline soils, the treated filtered wastewater is preferably pH adjusted with lime until an acidified treated secondary recovery water of a pH of approximately 6.5 to reduce the accumulation of limestone deposits in the soil is produced for better plant growth and water usage.

Although this specification has made reference to the illustrated embodiments, it is not intended to restrict the scope of the claims. The claims themselves recite those features deemed essential to the invention.

We claim:

1. A chemical/biological wastewater treatment method for saline wastewater with dissolved and un-dissolved solids comprising:
   a. separating the solids in the wastewater influent by passing it through at least one porous drain bag in communication with wastewater influent, the drain bag having a mesh sized to collect and separate suspended solids from filtered wastewater with suspended particles of a size not plugging up a sulfurous acid generator for subsequent acidification,
   b. collecting the filtered wastewater passing through the drain bag; the drain bag and container, when filled with solids, adapted to be hauled away and the filled drain bag land filled, burned, or gasified, c. passing the filtered wastewater through a sulfurous acid generator, injecting $SO_2$ into the filtered wastewater forming acidified filtered wastewater at a pH which generates sufficient sulfurous acid, and free $SO_2$ for disinfection, odor suppression, and conditioning of any suspended solids to agglomerate and separate from the liquid fraction of the filtered acidified wastewater, d. holding the filtered and acidified wastewater influent within a structure to capture any excess $SO_2$ released from the acidified wastewater for reinjection into the wastewater influent for sufficient time to disinfect, deodorize, and condition and the wastewater and any suspended solids within it to agglomerate, and for dissolved solids, other nutrients, and ammonia to form a conditioned wastewater f. adjusting the pH of the conditioned wastewater with hydrated or anhydrous lime to reduce the biocidal properties of the free $SO_2$, sulfite, and bisulfite in the wastewater and provide a pH conditioned wastewater required for subsequent environmental biological treatment, g. filtering the pH conditioned wastewater further to remove suspended solids and precipitates to provide a filtered conditioned wastewater of a particle size and concentration level required by end user effluent requirements producing a high BOD dissolved solids and ammonia nutrient liquid solution;

g. disposing of the separated solids by land filling, burning, or gasification or composting, and h. passing the nutrient liquid solution through an environmental biological system for consuming the nutrients by land applying it for propagation of biosynthetic fuels.

2. A chemical/biological wastewater treatment method for saline wastewater according to claim 1, wherein the lime calcium content of the waste water is increased to affect a decrease of the Sodium Adsorption Ratio (SAR) of the waste water to enhance the agronomic condition of the soil where it is applied and the pH of the conditioned wastewater is maintained below 7 at an acidic level to dissolve bicarbonates to prevent soil plugging.

3. A chemical/biological wastewater treatment method for saline wastewater according to claim 2, wherein the amount of lime added to the conditioned wastewater produces a soil SAR of under 15.

4. A chemical/biological wastewater treatment method for saline wastewater according to claim 1, wherein the environmental biological system for consuming nutrients comprises halophile organisms.

5. A chemical/biological wastewater treatment method for saline wastewater according to claim 1, wherein a material where calcium carbonate is the primary constituent, is added to neutralize acidity; adjust and control pH; increase the calcium content and affect a decrease of the Sodium Adsorption Ratio (SAR) of waste water so that the agronomic condition of the soil where it is applied can be enhanced and/or maintained.

6. A chemical/biological wastewater treatment apparatus for wastewater with dissolved and un-dissolved solids comprising:
   a. flow separation means in communication with wastewater influent from a gathering system for removing suspended solids from variable wastewater flows forming a filtered wastewater and separated solids,
   b. means for disposing of the separated solids,
   c. a sulfurous acid generator in communication with the filtered wastewater, injecting $SO_2$ into the filtered wastewater at a pH generating sufficient sulfurous acid, bi-sulfite, and free $SO_2$ for disinfection, separation, odor suppression and conditioning of any suspended solids to agglomerate and separate the suspended portion from the liquid fraction of the filtered and conditioned acidified wastewater,
   d. an enclosed detention vessel structured to hold the acidified wastewater and capture any excess $SO_2$ released from the acidified wastewater for re-injection into the wastewater influent, and retaining the $SO_2$/sulfurous acid/bi-sulfite wastewater at a pH between approximately 1.5 and 4.5, depending on dwell time, for a period of time to deodorize and condition the $SO_2$/sulfurous acid/bi-sulfite wastewater until the suspended solids agglomerate and dewater by shedding water upon separation and drying, dissolved solids and ammonia are $SO_2$/sulfurous acid/bi-sulfite treated resulting in odor reduction and color changes of the conditioned solids and liquids, and required effluent disinfection occurs to meet disinfection limits and form a conditioned wastewater,
   e. pH adjustment means associated with the conditioned wastewater to reduce the biocidal properties of any free $SO_2$, bi-sulfite, and sulfite in the conditioned wastewater and provide the pH required for subsequent environmental biological treatment, and
   f. an environmental biological system for treating the pH adjusted conditioned wastewater by land applying it for vegetation consumption, and/or passing it through aqueous vegetation, or microbial reduction of the dissolved and suspended solids and ammonia for BOD compliance to meet applicable land and open water discharge limits.

7. A chemical/biological wastewater treatment apparatus according to claim 6, wherein the flow separation means comprises at least one porous drain bag placed in a roll-off container structured to collect wastewater passing through the drain bag, the drain bag having a mesh sized to collect and separate suspended solids of a size leaving a filtered wastewater for subsequent acidification, and wherein the drain bag, when filed with conditioned solids may be land filled, burned, or gasified.

8. A chemical/biological wastewater treatment apparatus according to claim 6, including a secondary porous bag to remove additional suspended solids from the pH adjusted conditioned wastewater at a concentration level required by end user effluent requirements.

9. A chemical/biological wastewater treatment apparatus according to claim 6, including acidification means periodically to treat the separated suspended solids with sulfurous acid and allow the separated solids to dewater by shedding water upon separation and drying to provide a dried high BTU content solid with low water content for land filling, burning or gasification.

10. A chemical/biological wastewater treatment apparatus according to claim 6, wherein the flow separation means comprises a primary clarifier or sequential batch reactor.

11. A chemical/biological wastewater treatment apparatus according to claim 6, including oxygenation means associated with the pH adjustment means to oxidize the conditioned wastewater for virus inactivation.

12. A chemical/biological wastewater treatment apparatus according to claim 6, wherein the pH adjustment means raise the pH of the conditioned wastewater to approximately 11 first to precipitate heavy metals contained in the wastewater as metal hydroxides for filtration removal, and second the resultant metal free filtrate is then pH reduced for subsequent environmental biological treatment.

13. A chemical/biological wastewater treatment apparatus for wastewater with dissolved and un-dissolved solids comprising:
   a. at least one porous drain bag in communication with wastewater influent to separate solids in the wastewater influent, the drain bag having a mesh sized to collect and separate suspended solids from filtered wastewater with suspended particles of a size not plugging up a sulfurous acid generator for subsequent acidification,
   b. a roll-off container onto which the porous drain bag is placed, the container structured to collect filtered wastewater passing through the drain bag; the drain bag and container, when filled with solids, adapted to be hauled away and the filled drain bag land filled, burned, or gasified,
   c. a sulfurous acid generator in communication with the filtered wastewater captured by the container for passage through the sulfurous acid generator, injecting $SO_2$ into the filtered wastewater forming acidified filtered wastewater at a pH thereby generating sufficient sulfurous acid, free $SO_2$ for disinfection, odor suppression, and conditioning of any suspended solids to agglomerate and separate from the liquid fraction of the filtered acidified wastewater,
   d. collection and transmission means in communication with the filtered acidified wastewater influent,
   e. a plurality of enclosed detention vessels adapted to receive the filtered and acidified wastewater influent and structured to capture any excess $SO_2$ released from the acidified wastewater for reinjection into the wastewater influent and to hold the filtered acidified wastewater for sufficient time to disinfect, deodorize, and condition and the wastewater and any suspended solids within it to agglomerate, and for dissolved solids, other nutrients, and ammonia to form a conditioned wastewater
   f. pH liming equipment associated with the conditioned wastewater for adjusting the pH of the conditioned wastewater with hydrated or anhydrous lime to reduce the biocidal properties of the free $SO_2$, sulfite, and bisulfate in the wastewater and provide a pH conditioned wastewater required for subsequent environmental biological treatment,
   g. a plurality of secondary filter bags associated with the pH conditioned wastewater to filter and further to remove suspended solids and precipitates from the pH conditioned wastewater the bag weave selected to provide a filtered conditioned wastewater of a particle size and concentration level required by end user effluent requirements producing a high BOD dissolved solids and ammonia nutrient liquid solution; the secondary filter bag and container, when filled with solids adapted to be hauled away and the secondary filled filter bag land filled, burned, or gasified and
   h. an environmental biological system for consuming the nutrients contained in the pH conditioned wastewater by land applying it for consumption, and/or passing it through aqueous vegetation or microbial reduction of the dissolved solids and ammonia for BOD compliance to produce water of sufficient quality to meet open water discharge requirements.

14. A chemical/biological wastewater treatment apparatus according to claim 13, wherein the wastewater is saline and the calcium content of the pH conditioned wastewater is increased to affect a decrease of the Sodium Adsorption Ratio (SAR) of the waste water to enhance the agronomic condition of the soil to which it is applied.

15. A chemical/biological wastewater treatment apparatus according to claim 14, wherein the pH of the pH conditioned wastewater is maintained below 7 at an acidic level to dissolve bicarbonates to prevent soil plugging.

* * * * *